(12) United States Patent
Inoue

(10) Patent No.: US 7,505,042 B2
(45) Date of Patent: Mar. 17, 2009

(54) EDITING APPARATUS, EDITING METHOD, AND PROGRAM

(75) Inventor: Keizo Inoue, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 11/227,926

(22) Filed: Sep. 16, 2005

(65) Prior Publication Data

US 2006/0071935 A1    Apr. 6, 2006

(30) Foreign Application Priority Data

Oct. 1, 2004    (JP)    ............................. 2004-290725

(51) Int. Cl.
    G06T 15/00    (2006.01)
(52) U.S. Cl. ................... 345/473; 382/294; 356/139.03
(58) Field of Classification Search ......... 345/473–475; 382/294; 356/139.03
    See application file for complete search history.

(56) References Cited

U.S. PATENT DOCUMENTS

| | | | |
|---|---|---|---|
| 6,597,443 B2 * | 7/2003 | Boman | 356/139.03 |
| 7,024,054 B2 * | 4/2006 | Cahill et al. | 382/294 |
| 7,073,127 B2 * | 7/2006 | Zhao et al. | 715/719 |
| 7,184,022 B2 * | 2/2007 | Xie et al. | 345/166 |

FOREIGN PATENT DOCUMENTS

| | | |
|---|---|---|
| EP | 0 863 510 A1 | 9/1998 |
| EP | 1 211 639 A2 | 5/2002 |
| JP | 2001-197366 | 7/2001 |

OTHER PUBLICATIONS

Candemir Toklu, et al., "Simultaneous Alpha Map Generation and 2-D Mesh Tracking for Multimedia Applications", Image Processing, IEEE, International Conference Proceedings, XP-010254121, vol. 1, Oct. 26-29, 1997, pp. 113-116.

Huitao Luo, et al., "An interactive authoring system for video object segmentation and annotation", Signal Processing, Image Communication, Elsevier Science Publishers, XP-004372662, vol. 17, No. 7, Aug. 2002, pp. 559-572.

James M. Rehg, et al., "Video Editing Using Figure Tracking and Image-Based Rendering", Image Processing, IEEE, International Conference Proceedings, XP-010529912, vol. 2, Sep. 10, 2000, pp. 17-20.

Patent Abstracts of Japan, JP 11-205673, Jul. 30, 1999.

Seiki Inoue, "An Object Extraction Method for Image Synthesis", Systems and Computers in Japan, XP-000334341, vol. 23, No. 9, Jan. 1992, pp. 67-77.

* cited by examiner

*Primary Examiner*—Phu K Nguyen
(74) *Attorney, Agent, or Firm*—Oblon, Spivak, McClelland, Maier & Neustadt, P.C.

(57) ABSTRACT

The present invention provides an editing apparatus, an editing method, and a program by which a user can freely and easily apply an effect while visually confirming a motion-image to be edited. The editing apparatus includes a playback/display unit that plays back and displays a motion-image, a position designation unit that designates the positions on the motion-image played back and displayed by the playback/display unit, a coordinate conversion unit that converts the positions designated by the position designation unit into virtual coordinates on the motion image, a storage unit that stores the virtual coordinates obtained by the coordinate conversion unit in association with frames of the motion-image, and an effect application unit that applies an effect to the motion-image based on the virtual coordinates stored in the storage unit.

10 Claims, 8 Drawing Sheets

EDITING APPARATUS, EDITING METHOD, AND PROGRAM

CROSS REFERENCE TO RELATED APPLICATIONS

The present invention contains subject matter related to Japanese Patent Application JP 2004-290725 filed in the Japanese Patent Office on Oct. 1, 2004, the entire contents of which being incorporated herein by reference.

BACKGROUND OF THE INVENTION

1. Field of the Invention

The present invention relates to an editing apparatus, editing method, and a program that apply an effect to a motion-image.

2. Description of the Related Art

As a technique for applying an effect such as mosaic to a motion-image, so-called "motion tracking" has been available. The motion tracking automatically tracks a characteristic object in the motion-image and applies an effect to the track of the object. With the motion tracking technique, it is possible to easily apply an effect to the object moving on the screen.

SUMMARY OF THE INVENTION

However, in the motion tracking, it is impossible to perform the application of an effect if there is no object to be tracked. Further, it is difficult to recognize an object with uncertain outline due to high-speed movement, one intersecting with other objects or backgrounds, one whose size varies, one that moves out of the motion-image once and moves in the motion-image again, so that an effect cannot reliably be applied to the target object.

To cope with this problem, a technique that arranges still pictures on the editing portion of the motion-image in chronological order and displays them, and inserts selected effect images into the target still image to thereby display the still images to which an effect has been applied has been available (refer to, for example, Jpn. Pat. Appln. Laid-Open Publication No. 11-205673). However, the use of the selected effect image prevents an effect from being freely applied.

The present invention has been proposed in view of the above situation, and it is desirable to provide an editing apparatus, editing method, and a program capable of freely and easily applying an effect.

According to the present invention, there is provided an editing apparatus including: a playback/display means for playing back and displaying a motion-image; a position designation means for designating the positions on the motion-image played back and displayed by the playback/display means; a coordinate conversion means for converting the positions designated by the position designation means into virtual coordinates on the motion image; a storage means for storing the virtual coordinates obtained by the coordinate conversion means in association with frames of the motion-image; and an effect application means for applying an effect to the motion-image based on the virtual coordinates stored in the storage means.

According to the present invention, there is also provided an editing method including: a playback/display step of playing back and displaying a motion-image; a position designation step of designating the positions on the motion-image played back and displayed in the playback/display step; a coordinate conversion step of converting the positions designated in the position designation step into virtual coordinates on the motion image; a storage step of storing the virtual coordinates obtained in the coordinate conversion step in a storage means in association with frames of the motion-image; and an effect application step of applying an effect to the motion-image based on the virtual coordinates stored in the storage means.

According to the present invention, there is also provided a program allowing a process of editing a motion-image to be executed, the program including: a playback/display step of playing back and displaying a motion-image; a position designation step of designating the positions on the motion-image played back and displayed in the playback/display step; a coordinate conversion step of converting the positions designated in the position designation step into virtual coordinates on the motion image; a storage step of storing the virtual coordinates obtained in the coordinate conversion step in a storage means in association with frames of the motion-image; and an effect application step of applying an effect to the motion-image based on the virtual coordinates stored in the storage means.

According to the present invention, a motion-image is played back and displayed to a user, the positions that are designated by the user are converted into virtual coordinates on the motion-image, and the obtained virtual coordinates are stored in association with frames of the motion-image. With this configuration, the user can freely and easily apply an effect while visually confirming the motion-image.

DETAILED DESCRIPTION OF THE PREFERRED EMBODIMENTS

Figure 1:
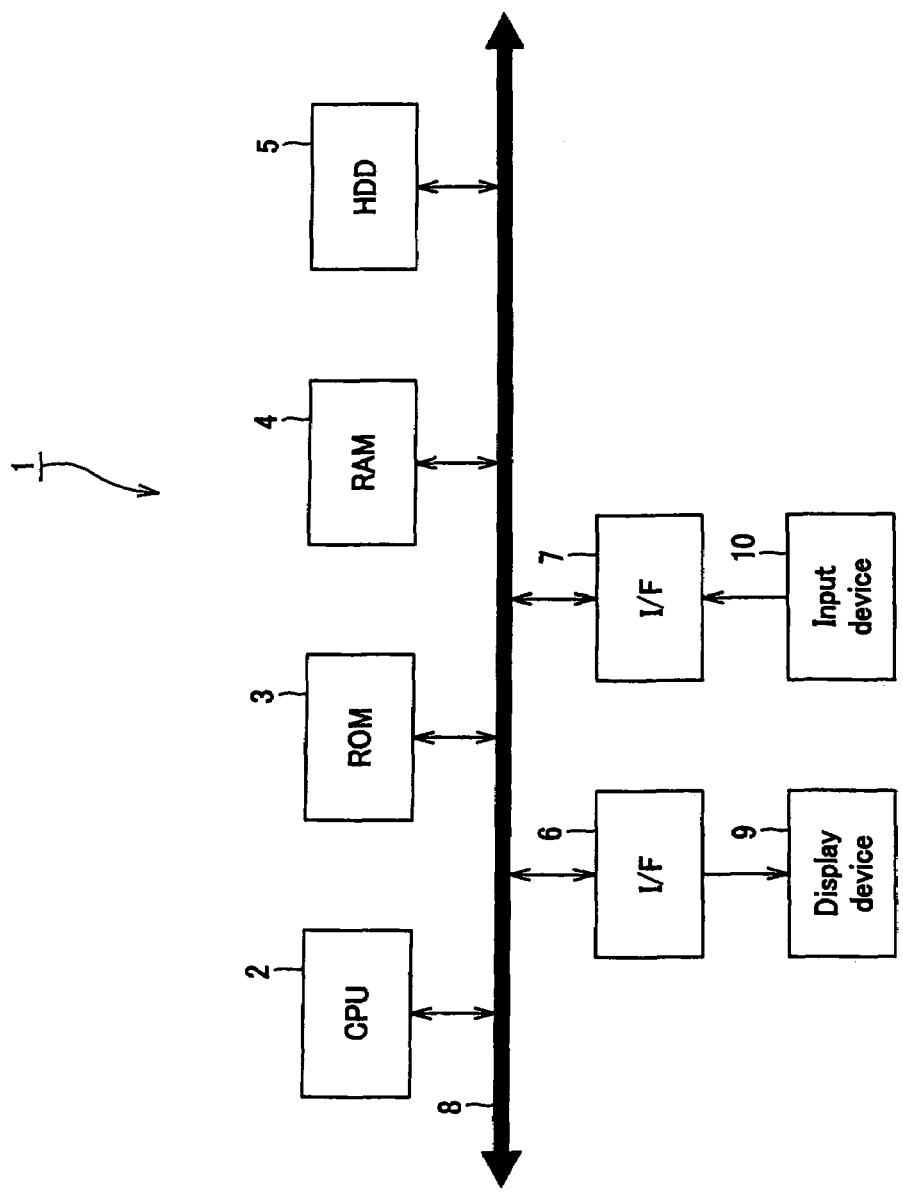
FIG. 1 is a block diagram showing an internal configuration of an editing apparatus according to an embodiment of the present invention.

Embodiment of the present invention will be described below in detail with reference to the accompanying drawings. FIG. 1 is a block diagram schematically showing an internal configuration of an editing apparatus 1. In the editing apparatus 1, a CPU (Central Processing Unit) 2, a ROM (Read Only Memory) 3, a RAM (Random Access Memory) 4, an HDD (Hard Disc Drive) 5 and interface circuits 6, 7 are connected through a bus 8. Further, a display device 9 and an input device 10 are connected to the bus 8 though the interface circuits 6, 7.

When receiving an instruction to execute a predetermined process from the input device 10 such as a mouse or keyboard through the interface circuit 7, the CPU 2 executes various processes according to a program stored in the ROM 3 or HDD 5. For example, the CPU 2 reads out a motion-image file from the HDD 5 as needed and allows the display device 9 to display the motion-image using GUI (Graphical User Interface). Further, the CPU 2 allows the display device 9 to display a point indicating the position on the screen according to an input operation through the input device such as a mouse.

Figure 2:
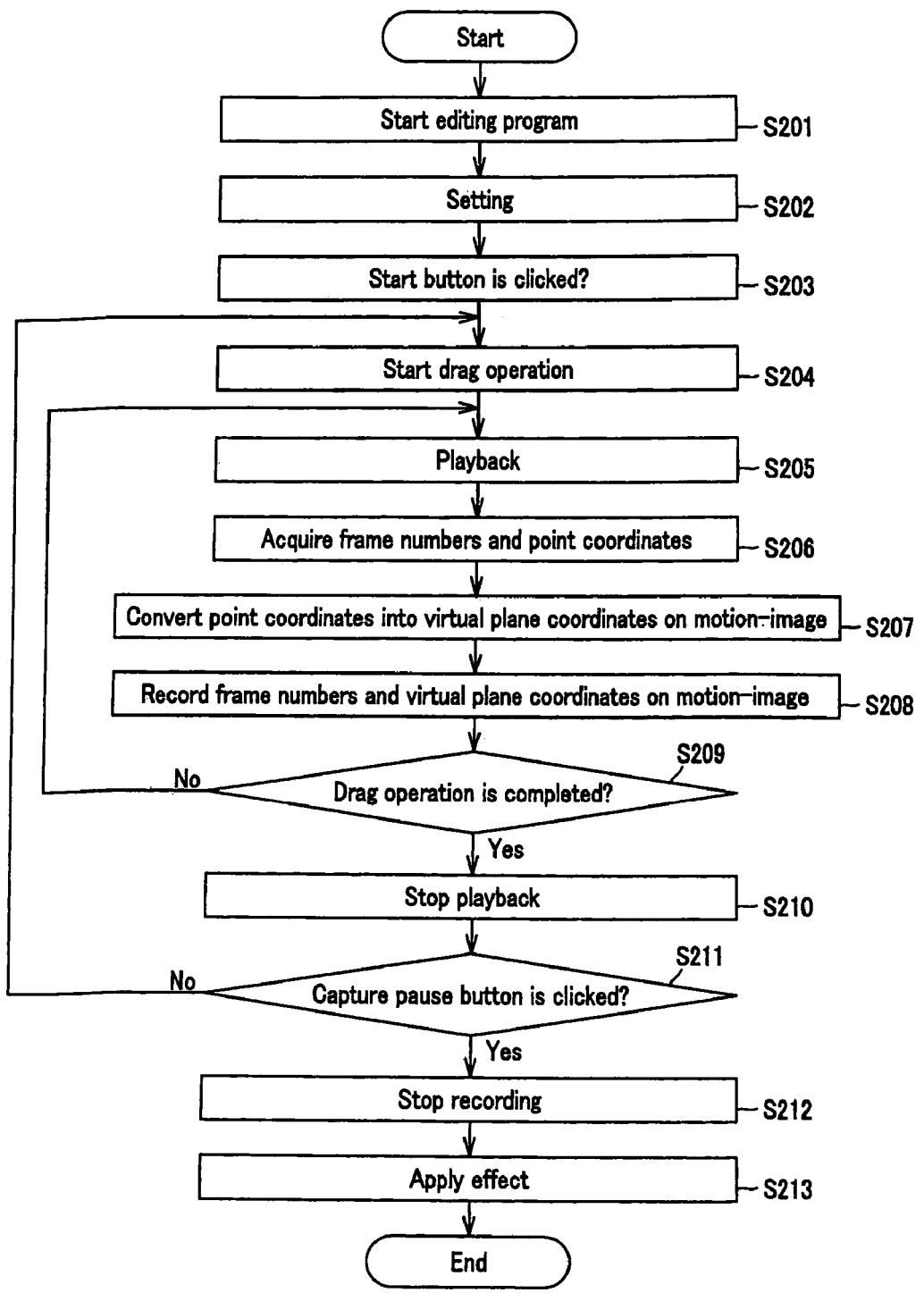
FIG. 2 is a flowchart showing an editing method according to the embodiment.
Figure 3:
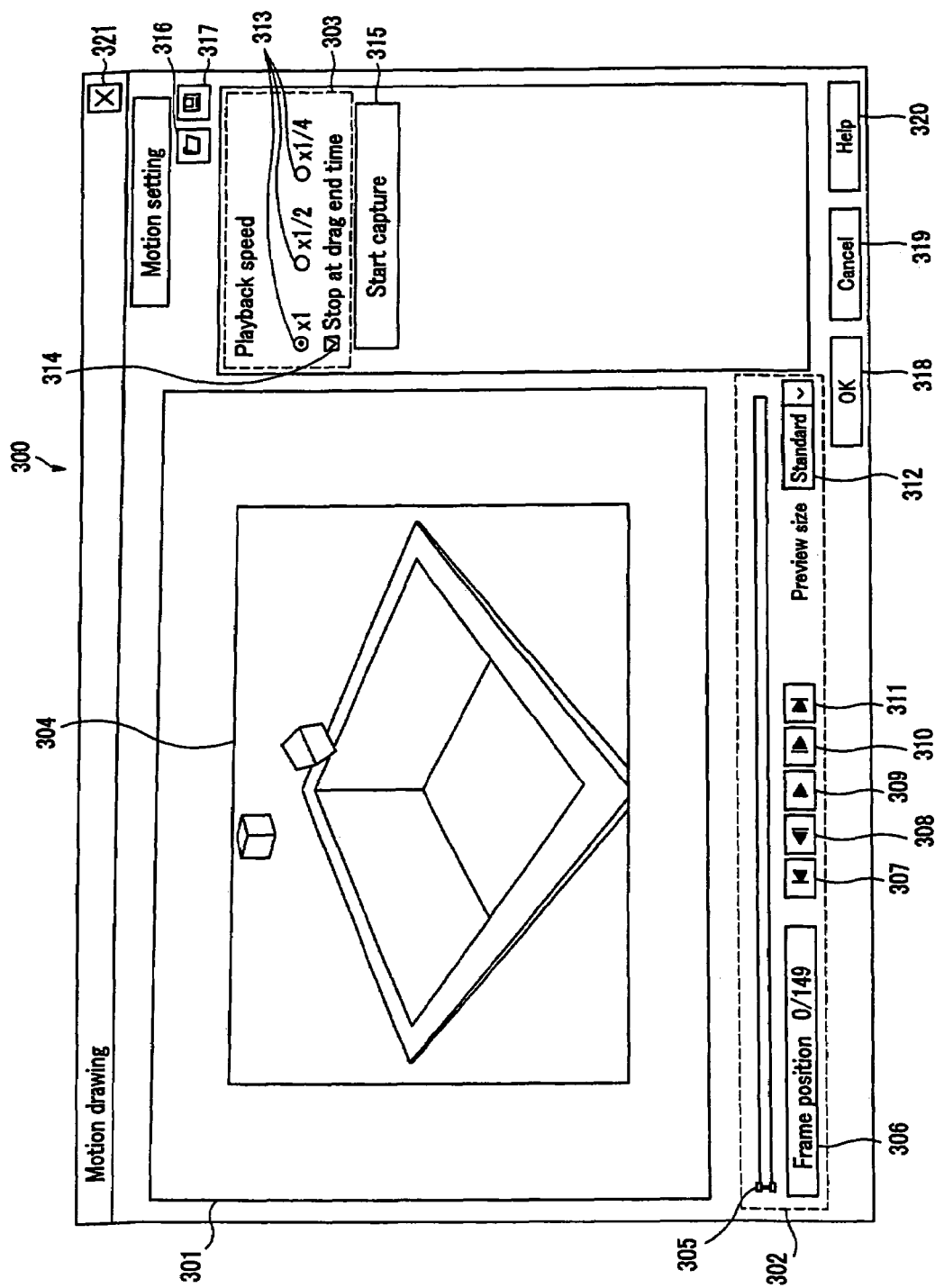
FIG. 3 is a view showing a graphic example based on GUI.

Next, a method of editing a motion-image according to the embodiment will be described with reference to a flowchart of FIG. 2. Firstly, in step S201, a graphic 300 based on GUI as shown in FIG. 3 is displayed on the display device 9 through a user's predetermined operation.

The graphic 300 is roughly constituted by a motion-image display area 301, a playback operation area 302, and a setting area 303.

On the motion-image display area 301, a motion-image 304 of a predetermined frame selected on the playback operation area 302 is displayed.

The playback operation area 302 includes a slide button 305, a frame position display section 306, playback operation buttons 307 to 311, and a preview size setting section 312. On the slide button 305 and frame position display section 306, the frame position of the motion-image data that is being displayed on the motion-image display area 301. The playback buttons 307 to 311 include a top frame moving button 307, a frame reverse button 308, a playback button 309, a frame advance button 310, and a final frame moving button 311 and are used for playing back the motion-image file at a desired frame position. The preview size setting section 312 is used for setting the size of the motion-image 304 to be displayed on the motion-image display area 301. This setting allows the motion-image 304 to be displayed in an enlarged manner on the entire motion-image display area 301.

The setting area 303 has a playback speed selection radio button group 313 and a checkbox 314. The playback speed selection radio button group 313 has choices of playback speed in the drag operation. Although 1×Speed, ½×Speed, ¼×Speed are available as choices in this example, the choices are not limited to these three. The checkbox 314 is used for determining whether the playback operation is ended or not at the end time of the drag operation by making a user to mark the checkbox 314.

The use of a capture start button 315 allows a program for recording point coordinates in the drag operation (to be described later) to be executed. An open button 316 is used for opening the motion-image file to be edited. The use of the open button allows user's desired motion-image file to be read out. A save button 317 is used for saving a state of the motion-image file, playback speed, or the like.

An OK button 318, which corresponds to the capture start button 315, is used for executing a track depiction program according to the drag operation (to be described later). A cancel button 319 is used for canceling the editing program and corresponds to a close button 321. A help button 320 is used for executing a program that gives explanations of terms, operations, and the like.

Returning to FIG. 2, in step S202, various settings are made based on the graphic 300. For example, the open button 316 is opened to read out a desired motion-image file, and the slide button 305 and playback operation buttons 307 to 311 are used to set the position of the frame that the user wants to apply an effect to. After that, on the setting area 303, playback speed at which the track for applying an effect is depicted or whether playback operation is stopped or not at the end time of the drag operation of depicting the track is set. Hereinafter, it is assumed that the playback operation is stopped at the drag operation end time.

Figure 4:
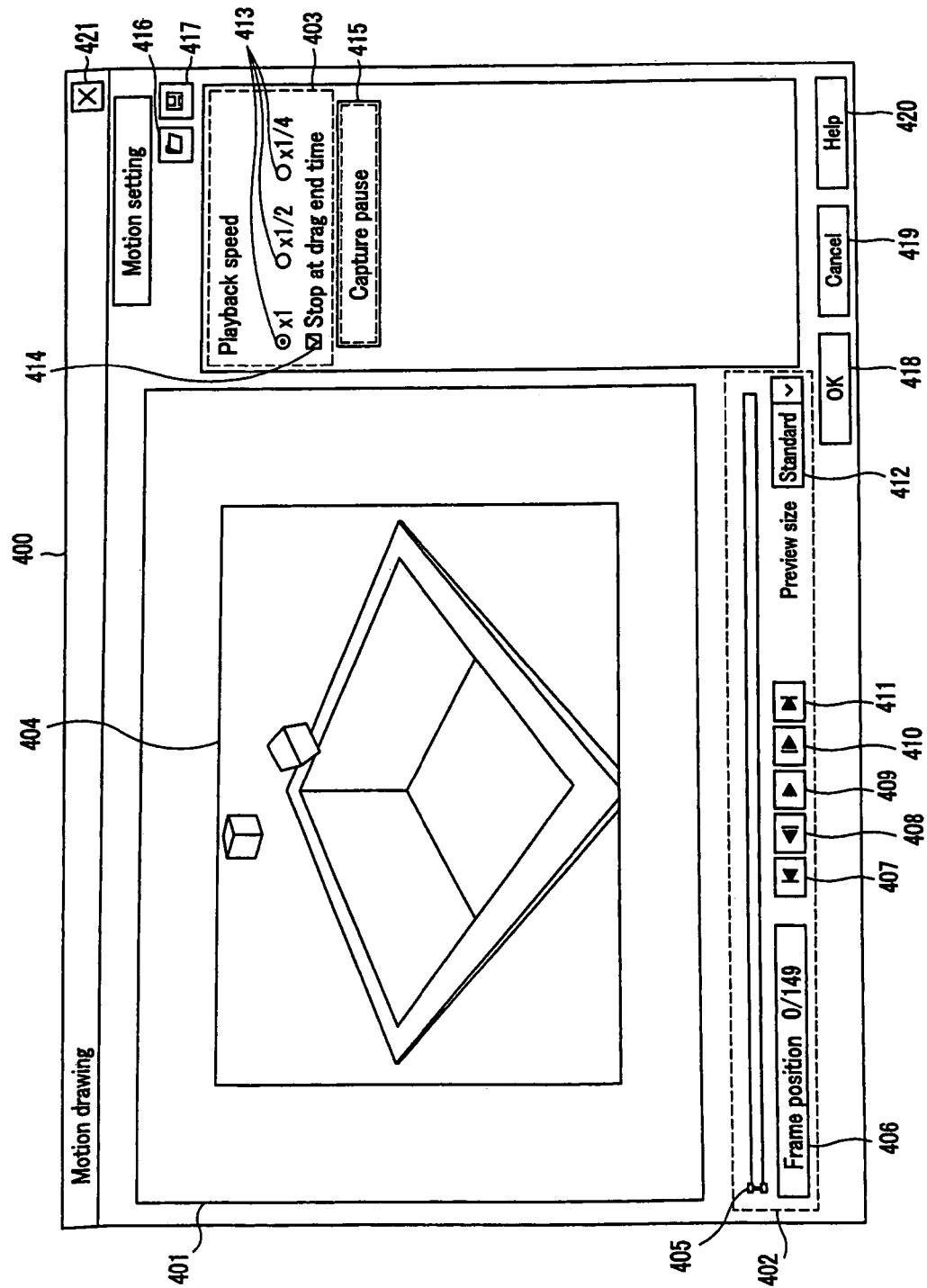
FIG. 4 is a view showing a graphic example based on GUI.

When the capture start button 315 is clicked after the frame position or playback speed of the motion-image file to be edited is set in step S202, the apparatus enters a state where it is possible to start the track depiction through a drag operation (step S203). At this time, the CPU 2 switches the display screen from the graphic 300 to a graphic 400 as shown in FIG. 4. In this graphic 400, the capture start button 315 on the graphic 300, which has been clicked in step S202, is changed into a capture pause button 415 for track depiction and the other buttons and the like are in an inactive state. The buttons and the like 401 to 420 (excluding 415) correspond to the buttons and the like 301 to 321 on the graphic 300 shown in FIG. 3 and the description thereof will be omitted.

When the motion-image display area 401 shown in FIG. 4 is dragged with the input device 10 such as a mouse (step S204), playback operation is started from the predetermined frame position set in the step S202 (step S205). At the same time, the CPU 2 acquires frame numbers of the motion-image and point coordinates (step S206).

Figure 5:
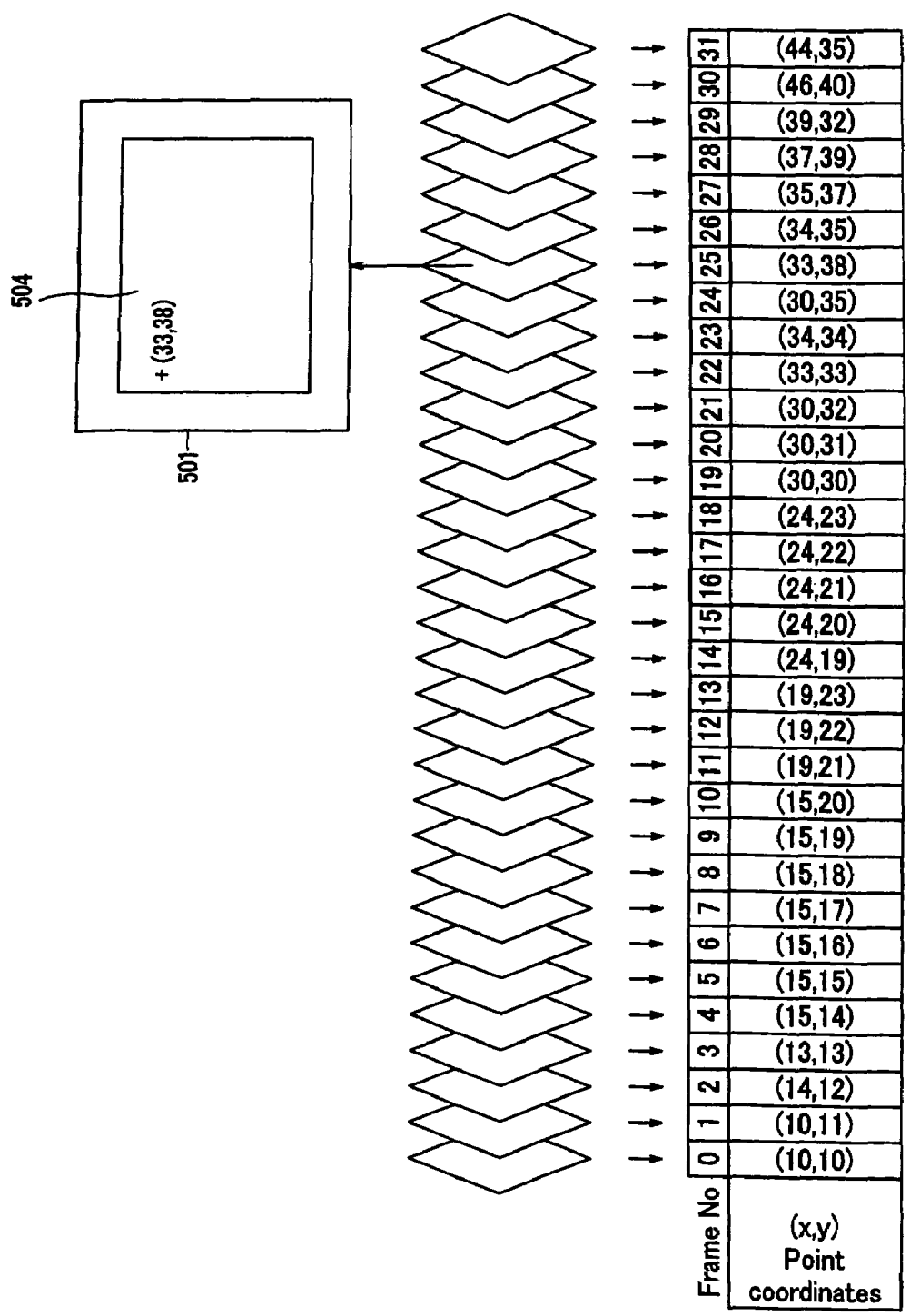
FIG. 5 is a view for explaining acquisition of point coordinates.

FIG. 5 shows a relationship between the point coordinates and frame numbers of the motion-image acquired in step S206. As shown in FIG. 5, the point coordinates on the motion-image display area 501 is stored in the RAM or the like in association with the frame number of the motion-image that is being played back. That is, the position that has been designated by the drag operation in step S206 is recorded for each frame of the motion-image that is being played back. For example, in FIG. 5, point coordinates corresponding to the frame numbers 0 to 31 are stored. When the point coordinates on the frame numbers 0 to 31 are connected to each other in chronological order, a track for applying an effect is obtained. The point coordinates on the motion-image display area 501 covers the outside area of the motion-image 504, so that even if a target object moves out of the frame for a moment, the point coordinates can continuously be acquired and recorded. As described above, the point coordinates of the drag operation can be acquired for each frame of the motion-image, so that the user can freely depict the track while viewing the motion-image.

The point coordinates acquired in step S206 are converted into virtual plane coordinates on the motion-image (step S207) and recorded in the RAM 4 or the like in association with the frame numbers (step S208).

The motion-image is played back until the drag operation has been completed (step S209). That is, the steps S205 to S208 are repeated until the drag operation has been completed to thereby acquire a motion path which is the track to which an effect is applied. When the drag operation has been completed in step S209, the CPU 2 stops playback of the motion-image (step S210).

Figure 6:
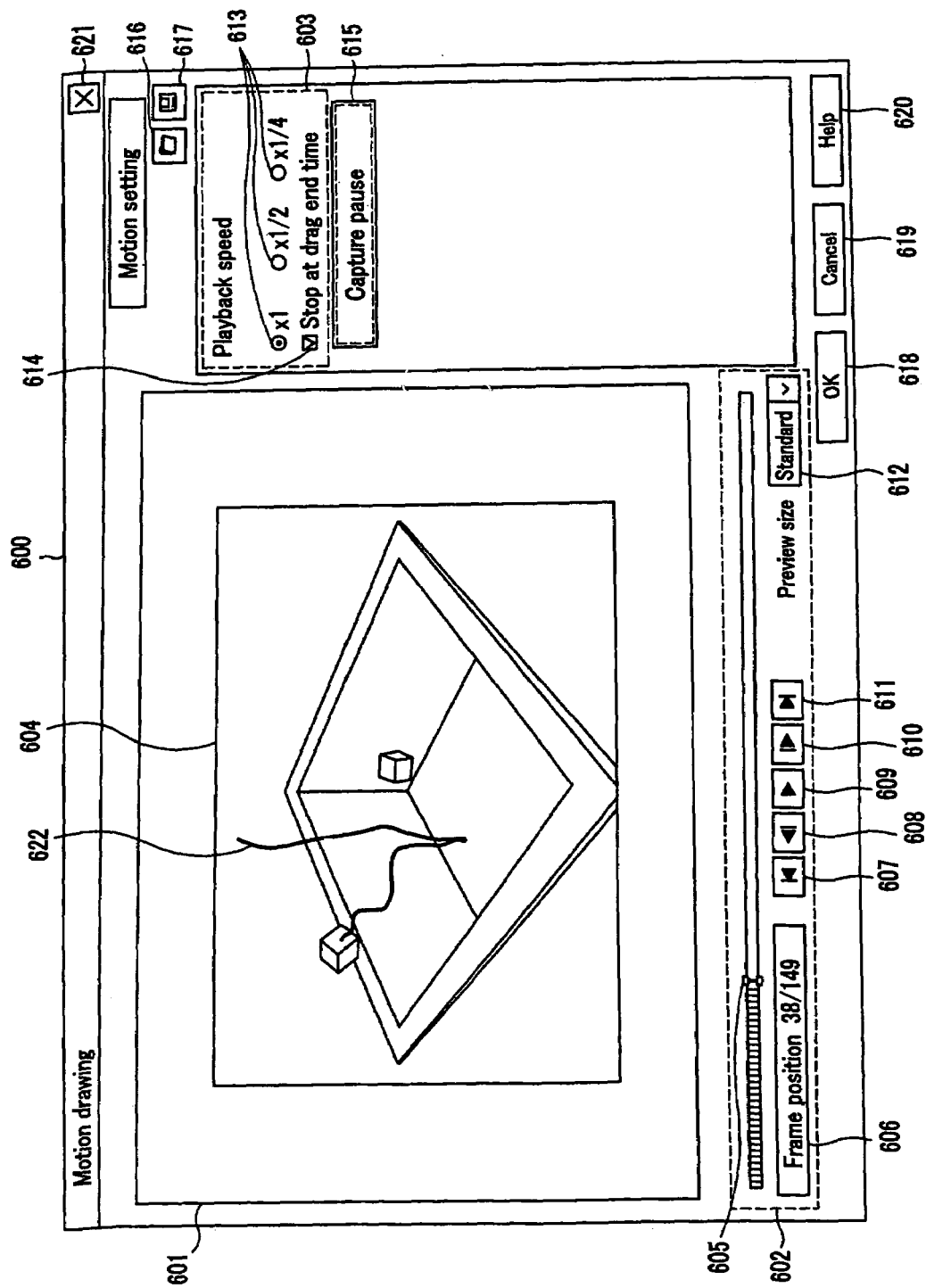
FIG. 6 is a view showing a graphic example based on GUI.

As a result of the drag operation, a track 622 of the motion path as shown in FIG. 6 is displayed on the motion-image display area 601. On a graphic 600 shown in FIG. 6, the track 622 of the motion path from frame positions 0 to 38 is displayed. The buttons and the like 601 to 621 correspond to the buttons and the like 401 to 421 on the graphic 400 shown in FIG. 4 and the description thereof will be omitted.

In step S211, the click of the capture pause button 615 stops recording operation of the virtual plane coordinates (step S212). In step S213, the following effect is applied based on the virtual plane coordinates on the motion-image recording through the above operation.

Through the above editing operation, the user can start the playback of the motion-image at a desired frame and freely depict the track and, therefore, he or she can reliably and easily apply an effect. Further, the playback of the motion-image is stopped simultaneously with the completion of the drag operation, so that it is possible to depict the track only on the frames that the user wants to apply an effect to. Further, selection of the playback speed allows the user to easily depict the track even under the condition that the movement of a target object is fast or complicated.

Figure 7:
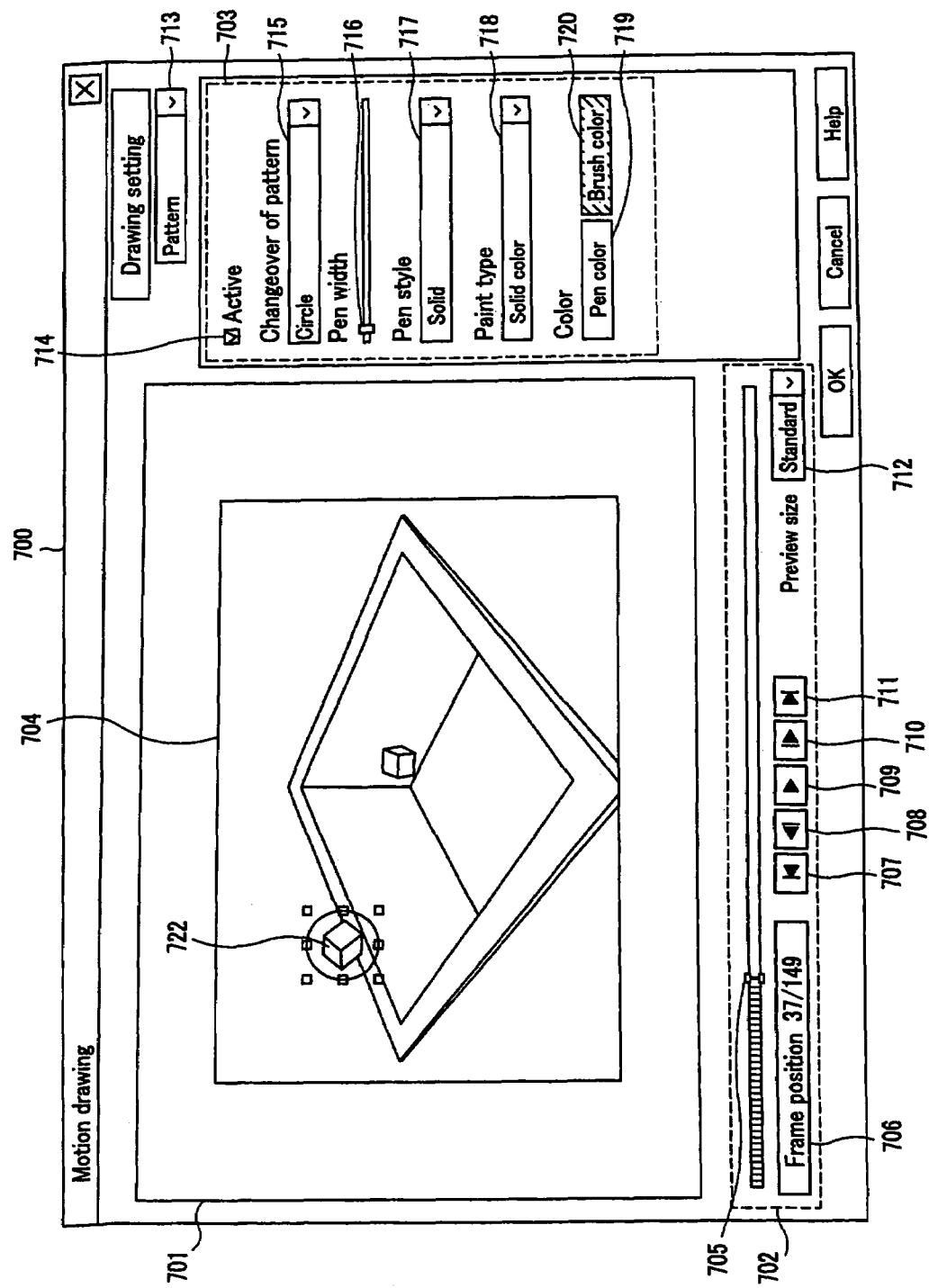
FIG. 7 is a view showing a graphic example based on GUI.

Next, the application of an effect will be described with examples. FIG. 7 shows an example in which a pattern effect has been applied to the track 622 of the motion path. Like the graphic 300 shown in FIG. 3, a graphic 700 in which a pattern effect has been applied is roughly constituted by a motion-image display area 701, a playback operation area 702, and a setting area 703. The motion-image display area 701 and playback operation area 702 respectively correspond to the motion-image display area 301 and playback operation area 302 shown in FIG. 3, and the description thereof will be omitted.

The setting area 703 is displayed when a pattern is selected from an object selection menu 713 and includes an active check button 714, a pattern changeover menu 715, a pen width slider 716, a pen style menu 717, a painting type menu 718, a pen color menu 719, and a brush color menu 720.

When the user wants to display the pattern selected on the pattern changeover menu 715 on a motion-image 704, he or she checks the active check button 714. The pattern changeover menu 715 has choices such as circle, triangle, quadrangle, star, arrow, straight line, polygonal line, and polygon, from which the user can select a desired object. The pen width slider 716 is used for adjusting the width of the outline of the object. The pen style menu 717 has choices of the line type such as solid, dash, dot, dash-dot. The painting type menu 718 has choices such as solid color, blurring, blurring and inversion, mosaic, mosaic and inversion, background transparent. The pen color menu 719 presents the line colors of the outline of the pattern, and the brush color menu 720 presents the internal colors of the pattern. By freely making the above settings on the setting area 703, the user can easily add a desirable pattern to the track 622.

Figure 8:
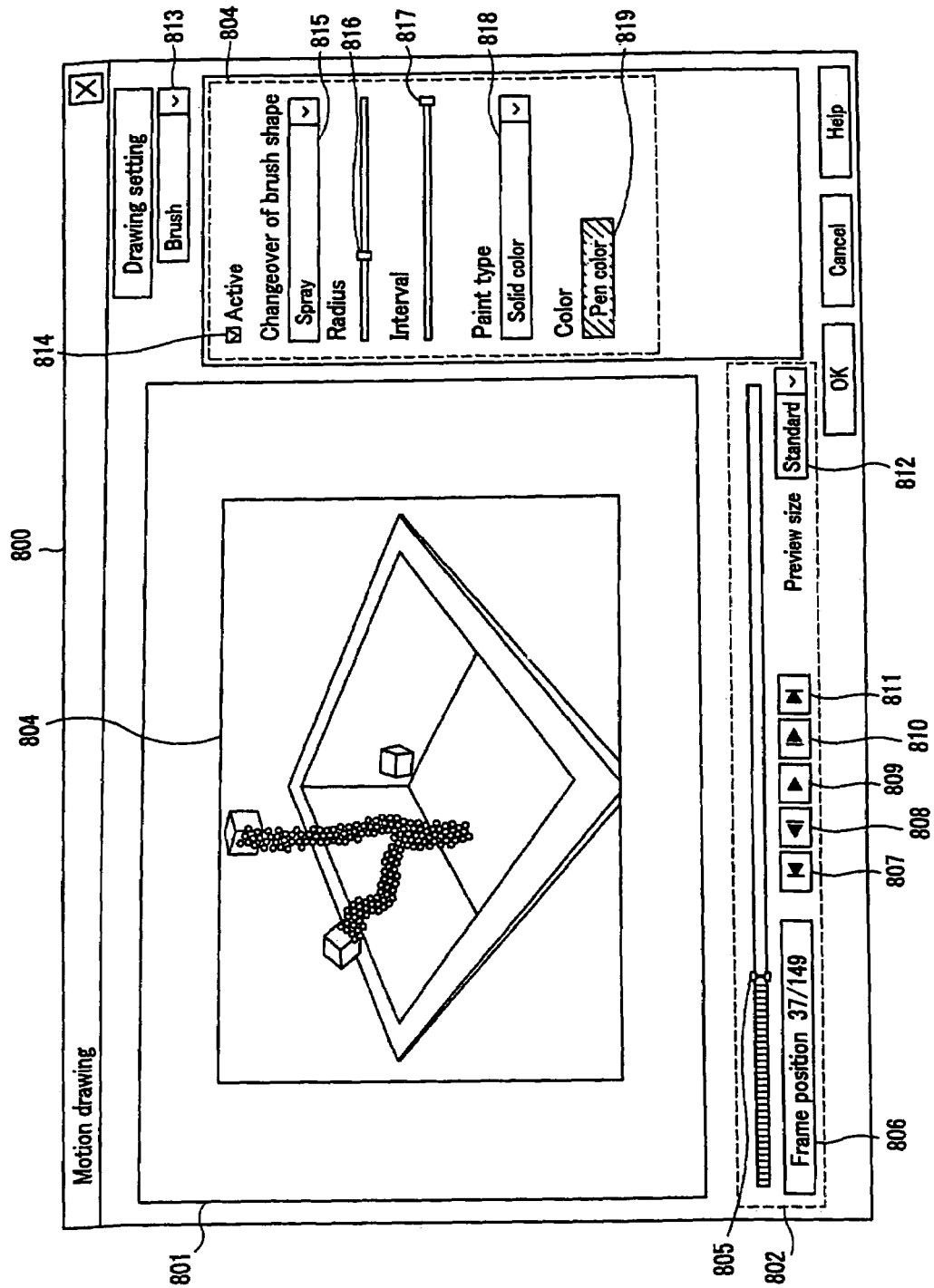
FIG. 8 is a view showing a graphic example based on GUI.

FIG. 8 shows an example in which a brush effect has been applied to the track 622 of the motion path. Like the graphic 300 shown in FIG. 3, a graphic 800 in which a brush effect has been applied is roughly constituted by a motion-image display area 801, a playback operation area 802, and a setting area 803. The motion-image display area 801 and playback operation area 802 respectively correspond to the motion-image display area 301 and playback operation area 302 shown in FIG. 3, and the description thereof will be omitted.

The setting area 803 is displayed when a brush is selected from an object selection menu 813 and includes an active check button 814, a brush shape changeover menu 815, a radius slide button 816, an interval slide button 817, a painting type menu 818, and a pen color menu 819.

When the user wants to display the pattern selected on the pattern changeover menu 715 on a motion-image 804, he or she checks the active check button 814. The brush shape changeover menu 815 has choices such as circle, circular blurring, quadrangle, quadrangular blurring, spray, crayon, from which the user can select a desired brush particle size. The radius slide button 816 is used for adjusting the radius of the brush particles. The interval slide button 817 is used for adjusting the interval between the particles selected on the brush shape changeover menu 815. The painting type menu 818 has choices such as solid color, blurring, blurring and inversion, mosaic, mosaic and inversion, background transparent. The pen color menu 819 presents the colors of the brush particles. By making the above settings on the setting area 803, the user can easily and freely add a desirable type of the brush particle to the track 622.

As described above, according to the present invention, it is possible to freely and easily apply an effect while playing back a motion-image to be edited at a desirable speed and visually confirming the motion-image.

It should be understood by those skilled in the art that various modifications, combinations, sub-combinations and alternations may occur depending on design requirements and other factors insofar as they are within the scope of the appended claims or the equivalents thereof.

What is claimed is:

1. An editing apparatus comprising:
    playback/display means for playing back and displaying a motion-image;
    position designation means for designating the positions on the motion-image played back and displayed by the playback/display means;
    playback speed adjusting means for adjusting a playback speed of the motion-image played back and displayed by the playback/display means;
    image size adjusting means for adjusting a size of the motion-image played back and displayed by the playback/display means;
    coordinate conversion means for converting the positions designated by the position designation means into virtual coordinates on the motion image, the coordinate conversion means tracking the positions in a motion-image display area larger than the motion-image and generating virtual coordinates when a position is located outside of the motion-image but within the motion-image display area;
    storage means for storing the virtual coordinates obtained by the coordinate conversion means in association with frames of the motion-image; and
    effect application means for applying an effect to the motion-image based on the virtual coordinates stored in the storage means.

2. The editing apparatus according to claim 1, wherein the playback/display means plays back and displays the motion-image while the position in a given area is designated by the position designation means.

3. An editing method comprising:
    playing back and displaying a motion-image;
    designating the positions on the motion-image played back and displayed in the playing back and displaying;
    adjusting a playback speed of the motion-image played back and displayed in the playing back and displaying;
    adjusting a size of the motion-image played back and displayed in the playing back and displaying;
    converting the positions designated in the designating into virtual coordinates on the motion image, said converting including tracking the positions in a motion-image display area larger than the motion-image and generating virtual coordinates when a position is located outside of the motion-image but within the motion-image display area;
    storing the virtual coordinates obtained in the coordinate conversion step in a storage unit in association with frames of the motion-image; and
    applying an effect to the motion-image based on the virtual coordinates stored in the storage unit.

4. The editing method according to claim 3, wherein the playing back and displaying includes playing back and displaying the motion-image while the position in a given area is designated in the designating.

5. A computer-readable storage medium including computer executable instructions, wherein the instructions, when executed by a processor, cause the processor to perform a process comprising:
    playing back and displaying a motion-image;

designating the positions on the motion-image played back and displayed in the playing back and displaying;

adjusting a playback speed of the motion-image played back and displayed in the playing back and displaying;

adjusting a size of the motion-image played back and displayed in the playing back and displaying;

converting the positions designated in the designating into virtual coordinates on the motion image, said converting including tracking the positions in a motion-image display area larger than the motion-image and generating virtual coordinates when a position is located outside of the motion-image but within the motion-image display area;

storing the virtual coordinates obtained in the coordinate conversion step in a storage unit in association with frames of the motion-image; and applying an effect to the motion-image based on the virtual coordinates stored in the storage unit.

6. The computer-readable storage medium according to claim 5, wherein the playing back and displaying includes playing back and displaying the motion-image while the position in a given area is designated in the designating.

7. An editing apparatus comprising:

a playback/display unit configured to play back and display a motion-image;

a position designation unit configured to designate positions on the motion-image played back and displayed by the playback/display unit;

a playback speed adjusting unit configured to adjust a playback speed of the motion-image played back and displayed by the playback/display unit;

an image size adjusting unit configured to adjust a size of the motion-image played back and displayed by the playback/display unit;

a coordinate conversion unit configured to convert the positions designated by the position designation unit into virtual coordinates on the motion image, the coordinate conversion unit being configured to track the positions in a motion-image display area larger than the motion-image, and the coordinate conversion unit being configured to generate virtual coordinates when a position is located outside of the motion-image but within the motion-image display area;

a storage unit configured to store the virtual coordinates obtained by the coordinate conversion unit in association with frames of the motion-image; and an effect application unit configured to apply an effect to the motion-image based on the virtual coordinates stored in the storage unit.

8. The editing apparatus according to claim 7, wherein the playback/display unit is configured to play back and display the motion-image while the position in a given area is designated by the position designation unit.

9. The editing apparatus according to claim 7, further comprising:

a playback stop unit configured to stop play back as soon as the position designation unit no longer designates the position.

10. The editing apparatus according to claim 7, wherein the coordinate conversion unit tracks the positions in a motion-image display area larger than the motion-image in both horizontal and vertical directions.

* * * * *